July 19, 1927.
F. L. LIPCOT
1,636,099
CUSHION CONNECTION FOR VEHICLE CONSTRUCTION
Filed May 4, 1925
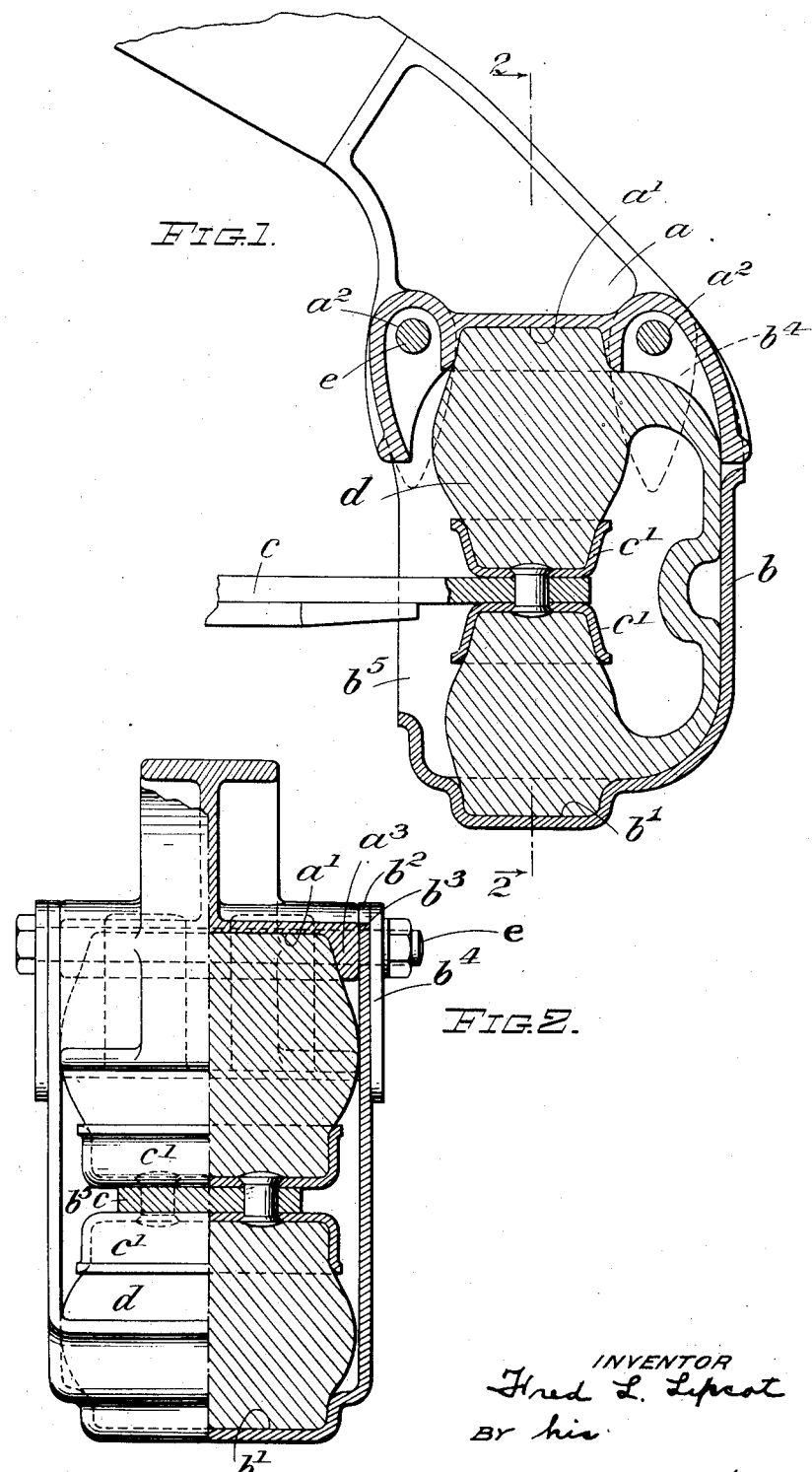
INVENTOR
Fred L. Lipcot
BY his
ATTORNEY'S
Redding, Greeley, O'Shea + Campbell Patented July 19, 1927.

1,636,099

UNITED STATES PATENT OFFICE.

FRED L. LIPCOT, OF NEW YORK, N. Y., ASSIGNOR TO THE RUBBER SHOCK INSULATOR COMPANY, INC., OF NEW YORK, N. Y., A CORPORATION OF DELAWARE.

CUSHION CONNECTION FOR VEHICLE CONSTRUCTION.

Application filed May 4, 1925. Serial No. 27,725.

This invention relates to cushion connections for vehicle construction of the kind in which yielding non-metallic material serves as a connection and support between two metallic parts of a motor vehicle, one of which parts is to be connected to and supported by the other of said parts as illustrated in the patent to Masury & Leipert No. 1,404,876 dated January 31, 1922. In the construction disclosed in the patent the yielding non-metallic material is maintained under a predetermined degree of compression to the end that the resiliency, strength and wearing qualities of the material may be increased. The present invention has for its object to provide a housing for a cushion connection of the character described which may be easily and conveniently manufactured in simple operations and which shall insure upon assembly, the requisite degree of internal static pressure in the non-metallic material. According to the invention the housing comprises an upper seat member for attachment to one of the vehicle parts and a cup-shaped cap portion formed with a lower seat for the non-metallic material and an opening in one side through which the other vehicle part enters the housing to be engaged by the non-metallic material. Preferably the upper seat member is formed in a die casting operation while the cup-shaped lower seat member which comprises substantially the entire housing is formed of pressed metal. Suitable apertures are formed in the upper seat member and at predetermined points in the cup portion and transversely extending through bolts are passed through the respective apertures to secure the parts together. By suitably positioning the apertures in the cup member the requisite degree of compression may be readily impressed upon the yielding non-metallic material without the necessity of computing or measuring the pressure applied. In order that the invention may be clearly understood and readily carried into effect the same will now be described more fully with reference to the accompanying drawings illustrating a preferred embodiment thereof, in which:

Figure 1 is a view in side elevation and partly in section showing a cushion connection according to the present invention.

Figure 2 is a transverse view partly in section taken in the plane indicated by the line 2—2 in Figure 1 and looking in the direction of the arrows.

Referring to the drawings an upper seat member $a$ which is preferably formed by a die casting operation is adapted to be secured in any convenient manner to one of a plurality of vehicle parts which are to be connected and supported by yielding non-metallic material. The upper member $a$ is formed with a seat $a'$ and apertures $a^2$ for the reception of bolts securing the component elements of the housing together. A cup-shaped portion $b$ formed with a seat portion $b'$ is adapted to be secured to the casting $a$. The cup member is preferably formed of sheet metal by a pressing or stamping operation and the side walls $b^2$ are adapted to extend upwardly and engage the side wall portions $a^3$ of the upper casting. Apertures $b^3$ are formed at predetermined points in the side walls $b^2$ to register with the apertures $a^2$. If desired the apertures $b^3$ may be suitably re-enforced as by the plates $b^4$. At the front of the housing the cup member $b$ is formed with an opening $b^5$ through which a vehicle part is adapted to extend. In the illustrated embodiment this vehicle part is shown as the spring $c$ carrying seats $c'$ to co-operate with the seats $a'$ and $b'$, respectively. Within the housing is disposed yielding non-metallic material $d$ retained between the respective seats $a'$, $c'$ and $c'$, $b'$ under compression.

It will thus be seen that the housing may be readily formed in a simple and cheap manner, the upper seat member being formed by a simple die casting operation and the lower or cup member being formed by a simple stamping operation. The block of yielding non-metallic material $d$ is readily assembled upon the seats $c'$ on the end of the spring $c$ and inserted within the cup member $b$ which may thereafter be easily assembled with the seat member $a$ by means of bolts $e$ passing through the respective apertures $a^2$ and $b^3$. The location of the apertures $b^3$ may be readily determined dependent upon the compression which it is desired to exert upon the yielding non-metallic material $d$ and the desired compression is assured upon the assembly of the housing. It is thus not necessary to determine by additional operations the desired degree of compression to be exerted upon the yielding non-metallic material but such compression is automatically obtained upon assembly and is always constant.

Various modifications may be made in the configuration and method of manufacture of the respective parts without departing from the spirit and scope of the invention.

What I claim is:

1. A housing for a connection and support of yielding non-metallic material adapted to be interposed between two metallic parts of a motor vehicle, one of which parts is to be connected to and supported by the other of said parts, comprising an upper seat member for attachment to one of the vehicle parts and a cup-shaped cap portion forming a housing and formed with a lower seat for the non-metallic material and an opening in one side through which the other vehicle part enters the housing to be engaged by the non-metallic material, means to secure the cap member to the upper seat member and means for reinforcing the sides of the housing.

2. A housing for a connection and support of yielding non-metallic material adapted to be interposed between two metallic parts of a motor vehicle, one of which parts is to be connected to and supported by the other of said parts, comprising an upper seat member for attachment to one of the vehicle parts and a pressed metal cup-shaped cap portion forming a housing and formed with a lower seat for the non-metallic material and an opening in one side through which the other vehicle part enters the housing to be engaged by the non-metallic material, means to secure the cup-member to the upper seat member in predetermined position and means including the securing means including the securing means for reinforcing the sides of the housing.

This specification signed this 29 day of April A. D. 1925.

FRED L. LIPCOT.